H. C. BERRY.
STRAIN GAGE OR APPARATUS FOR THE MEASUREMENT OF THE DEFORMATIONS OF MATERIALS UNDER STRESS.
APPLICATION FILED MAR. 17, 1911.

1,047,371.

Patented Dec. 17, 1912.

WITNESSES:
Fancher E. Wakefield.
George W. Miller

INVENTOR
Herman Claude Berry

UNITED STATES PATENT OFFICE.

HERMAN CLAUDE BERRY, OF LANSDOWNE, PENNSYLVANIA.

STRAIN GAGE OR APPARATUS FOR THE MEASUREMENT OF THE DEFORMATIONS OF MATERIALS UNDER STRESS.

1,047,371.  Specification of Letters Patent.  Patented Dec. 17, 1912.

Application filed March 17, 1911. Serial No. 615,158.

*To all whom it may concern:*

Be it known that I, HERMAN CLAUDE BERRY, a citizen of the United States, residing at Lansdowne, in the county of Delaware and State of Pennsylvania, have invented a new and useful Strain Gage or Apparatus for the Measurement of the Deformations of Materials Under Stress, of which the following is a specification.

My invention relates to improvements in the apparatus for the measurement of strains in material under stress, with especial reference to its application in tests of materials and structures in order to measure the strains in the different parts and thus obtain data for the study of the distribution of stress especially in case of complex structures.

The object sought is to provide a means for measuring very small changes in the distance between fixed points on the material or structure under test, which test may be made in a testing machine, or by application of load to an assembled structure. I attain this object by the mechanism illustrated in the accompanying drawing in which—

Figure 1:
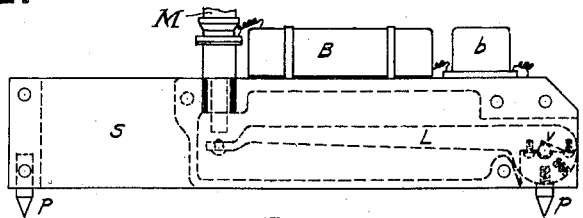
Figure 2:
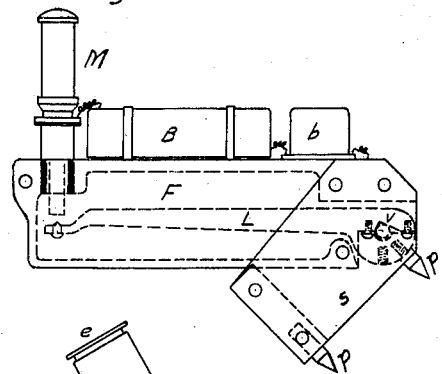
Figure 3:
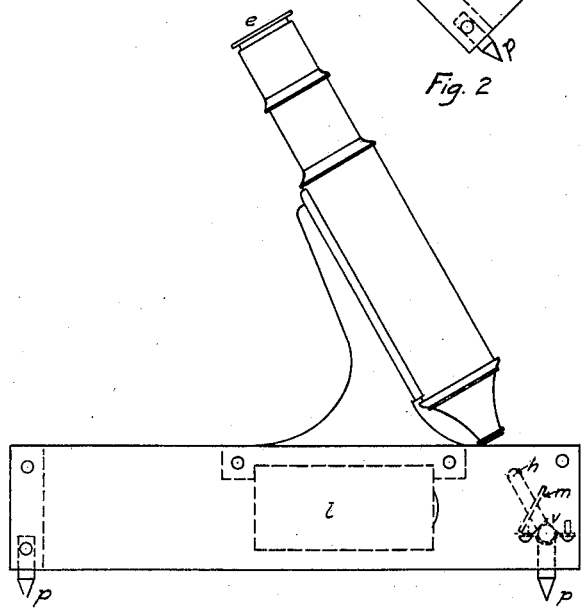

Figure 1 is a side elevation of the apparatus as arranged for use on the standard 8 inch gage length. Fig. 2 is a side elevation of the apparatus as arranged for use on short gage lengths. As shown in Fig. 2 the apparatus will give the necessary clearance to the heads of the common form of testing machines when testing short specimens. Fig. 3 shows the apparatus arranged to use a micrometer microscope for reading the deformations or strains.

In using the apparatus as shown in Figs. 1 and 2 the steel points *p* are inserted in small punched or drilled holes in the specimen spaced at the proper distance. A double punch is very convenient for this spacing. When the points are firmly set in the holes the micrometer screw M is turned till it comes in contact with the lever L which contact is very sensitively indicated by the use of a small dry battery and a buzzer so connected that the electric circuit is closed by the contact at the lever. The position of the lever is read on the micrometer and recorded, the load on the specimen changed and a second reading taken in the same way, the difference in the readings together with the constants of the instrument enable the operator to determine the actual change in length of the original gage length due to the change in the load. The accuracy of the apparatus depends upon the lever L finding the same position when the points are inserted into holes at the same distance apart, which requires that the lever operate with no lost motion. The V notch bearing at the axle of the lever is a very important factor in the attainment of this object. The axle is held in the V bearing by the pressure of a spring so there can be no lost motion at this place. Tests on longer gage lengths may be made by putting longer side bars S on the apparatus.

The apparatus as arranged in Fig. 2 is used in the same way. The clearance of the apparatus parts, and the heads of the testing machine made this form necessary for tests of the regular 2 in. test specimen.

Fig. 3 shows the apparatus arranged for the use of a micrometer microscope by which the change in the gage length is measured by reading on a graduated scale in the eyepiece of the microscope the successive positions of the cross hair *h* as seen through the microscope which is illuminated by light reflected from a small mirror *m* and coming from the small pocket flash lamp *l*. In using the apparatus the points *p* are applied to the gage lengths as in use of the other form of the apparatus, the eye of the observer is placed in position to read the microscope and the button of the flash lamp pressed and the reading taken. This may be done rapidly by a skilled observer.

I claim:

1. In a strain measuring apparatus a frame having a fixed conical point at one end and a notch bearing at the other end, a micrometer measuring device, a bell crank lever having a pivot in said notch, a spring on said frame, engaging said lever pivot to hold the same in said notch, one arm of said lever having a conical steel point and the other arm adapted to coöperate with said measuring device.

2. In a portable strain measuring apparatus adapted to be applied by hand without mechanical attachment to the specimen, a frame having a fixed conical point at one end and a notch bearing at the other end, a micrometer measuring device, a bell crank lever having a pivot in said notch, a spring on said frame engaging said lever pivot to hold the same in said notch, one arm of said lever having a conical steel point and the other arm adapted to coöperate with said measuring device.

3. In a portable strain measuring apparatus adapted to be applied to and removed from the specimen for each observation of the strain to be measured as the specimen deforms under change of load, a frame having a fixed conical point at one end and a bearing at the other end, a micrometer measuring device, a multiplying lever having a pivot engaging in said bearing, the short arm of said lever having a conical steel point, the long arm adapted to coöperate with said measuring device.

HERMAN CLAUDE BERRY.

Witnesses:
  ICY FERN MYERS,
  MARY B. SILVER.